United States Patent
Hung et al.

(10) Patent No.: US 12,483,130 B2
(45) Date of Patent: Nov. 25, 2025

(54) CONTROLLER OF POWER CONVERSION CIRCUIT AND OPERATING METHOD THEREOF

(71) Applicant: uPI semiconductor corp., Zhubei (TW)

(72) Inventors: Wei-Hsiu Hung, Zhubei (TW); Yen-Chih Lin, Zhubei (TW); Chen-Xiu Lin, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 332 days.

(21) Appl. No.: 18/306,374

(22) Filed: Apr. 25, 2023

(65) Prior Publication Data

US 2024/0022168 A1 Jan. 18, 2024

(30) Foreign Application Priority Data

Jul. 14, 2022 (TW) ................................. 111126527

(51) Int. Cl.
*H02M 3/157* (2006.01)
*H02M 1/00* (2006.01)

(52) U.S. Cl.
CPC ......... *H02M 3/157* (2013.01); *H02M 1/0009* (2021.05); *H02M 1/0012* (2021.05); *H02M 1/0025* (2021.05)

(58) Field of Classification Search
CPC .. H02M 3/157; H02M 1/0009; H02M 1/0012; H02M 1/0025; H02M 1/32; H02M 3/1584
USPC ........................................................ 323/283
See application file for complete search history.

(56) References Cited

U.S. PATENT DOCUMENTS

| | | | |
|---|---|---|---|
| 6,362,608 B1 * | 3/2002 | Ashburn | H02M 3/1584 323/272 |
| 8,816,657 B2 * | 8/2014 | Wang | H02M 3/1584 323/272 |
| 8,970,195 B2 * | 3/2015 | Zambetti | H02M 3/1584 323/283 |
| 9,240,721 B2 | 1/2016 | Babazadeh et al. | |
| 9,621,045 B2 | 4/2017 | Tang et al. | |
| 11,381,173 B2 * | 7/2022 | Chen | H02M 1/08 |

* cited by examiner

*Primary Examiner* — Thienvu V Tran
*Assistant Examiner* — Lauren Ashley Shaw
(74) *Attorney, Agent, or Firm* — McClure, Qualey & Rodack, LLP (57) ABSTRACT

A controller of a power conversion circuit generates PWM signals to control output stage circuits to provide an output voltage and a load current to an output terminal. The controller includes a sensing circuit, a comparison circuit, a PWM generation circuit and a control loop. The sensing circuit generates a current sensing signal related to load current. The comparison circuit compares the current sensing signal and a default value representing a current threshold to generate a comparison result. The control loop, coupled to the output terminal, the PWM generation circuit and the comparison circuit, generates a trigger signal according to a reference voltage and the output voltage to control the PWM generation circuit to generate PWM signals. When the comparison result indicates that the load current exceeds current threshold, the control loop temporarily stops providing trigger signal to PWM generation circuit to delay the generation of PWM signals.

4 Claims, 11 Drawing Sheets

CONTROLLER OF POWER CONVERSION CIRCUIT AND OPERATING METHOD THEREOF

BACKGROUND OF THE INVENTION

1. Field of the Invention

The invention relates to a power conversion circuit; in particular, to a controller of a power conversion circuit and an operating method thereof.

2. Description of the Prior Art

In general, when the current required by the load exceeds a specified level, the controller of the power conversion circuit needs to limit the output current of the power stage to achieve current limit effect.

A conventional current limit method is a PWM skip mode, that is, when the output current exceeds a default level, the next PWM signal is blocked to reduce the generation of the output current. If the PWM skip mode is directly used in the multi-phase power conversion circuit system to perform total current limit, the current balance will be difficult to control. That is to say, if the total current exceeds the default level, the next PWM signal is blocked to stop the corresponding phase current output, which is likely to cause the PWM signal of a specific phase to be blocked more often, resulting in uneven output current of each phase. If a single phase is often limited so that the output current of that phase is zero, it may even cause the current balancing mechanism to fail to operate.

Another known method is phase shielding, that is to say, when the total current exceeds a default level, some phases are disabled to achieve the effect of limiting total current. However, the disadvantage of this method is that when the shielded phase is reactivated, the output is prone to instability, so this technology also needs to be improved.

SUMMARY OF THE INVENTION

Therefore, the invention provides a controller of a power conversion circuit and an operating method thereof to solve the above-mentioned problems of the prior arts.

An embodiment of the invention is a controller of a power conversion circuit. In an embodiment, the controller of the power conversion circuit is coupled to a plurality of output stage circuits and generates a plurality of pulse width modulation (PWM) signals to control the output stage circuits respectively, so that the power conversion circuit provides an output voltage and a load current to an output terminal. The controller includes a sensing circuit, a first comparison circuit, a PWM generation circuit and a control loop. The sensing circuit is coupled to the output stage circuits and configured to generate a current sensing signal related to the load current. The first comparison circuit is coupled to the sensing circuit and configured to compare the current sensing signal and a default value to generate a first comparison result, wherein the default value represents a current threshold value. The PWM generation circuit is coupled to the output stage circuits. The control loop is coupled between the output terminal and the PWM generation circuit and also coupled to the first comparison circuit. The control loop is configured to generate a trigger signal according to a reference voltage and the output voltage to control the PWM generation circuit to generate the PWM signals. When the first comparison result indicates that the load current exceeds the current threshold value, the first comparison result makes the control loop to stop providing the trigger signal to the PWM generation circuit temporarily to delay the generation of the PWM signals.

In an embodiment, the control loop includes a ramp signal generation circuit, an error amplifier, a compensation circuit and a second comparison circuit. The ramp signal generation circuit is configured to generate a ramp signal and receive the trigger signal to reset the ramp signal. The error amplifier is coupled to the output terminal and configured to receive the reference voltage and a feedback voltage related to the output voltage to generate an error signal. The compensation circuit is coupled to the error amplifier and configured to receive the error signal to generate a compensation signal. The second comparison circuit is coupled to the ramp signal generation circuit, the compensation circuit and the PWM generation circuit respectively and configured to compare the ramp signal and the compensation signal to generate a second comparison result for generating the trigger signal.

In an embodiment, the ramp signal generation circuit is also coupled to the first comparison circuit. When the current sensing signal is greater than the default value, the first comparison result indicates that the load current exceeds the current threshold value, and the first comparison result makes a slope of a waveform of the ramp signal to be zero.

In an embodiment, the control loop further includes a logic gate. The logic gate is coupled to the first comparison circuit and the second comparison circuit respectively and configured to generate the trigger signal according to the first comparison result and the second comparison result for delaying the reset of the ramp signal.

In an embodiment, the control loop includes a second comparison circuit and a logic gate. The second comparison circuit is coupled to the output terminal and configured to receive and compare the reference voltage and a feedback voltage related to the output voltage to generate a second comparison result. The logic gate is coupled to the first comparison circuit and the second comparison circuit respectively and configured to generate the trigger signal according to the first comparison result and the second comparison result.

Another preferred embodiment of the invention is a method of operating a controller of a power conversion circuit. In this embodiment, the controller is coupled to a plurality of output stage circuits and generates a plurality of PWM signals to control the output stage circuits respectively, so that the power conversion circuit providing an output voltage and a load current to an output terminal. The method includes following steps of: (a) generating a current sensing signal related to the load current; (b) comparing the current sensing signal and a default value to generate a first comparison result, wherein the default value represents a current threshold value; (c) determining whether the first comparison result indicates that the load current exceeds the current threshold value; (d) if a determination result of the step (c) is no, providing a trigger signal according to a reference voltage and the output voltage to generate the PWM signals; and (e) if the determination result of the step (c) is yes, stopping providing the trigger signal temporarily to delay the generation of the PWM signals.

In an embodiment, the step (d) further includes: generating a ramp signal and resetting the ramp signal according to the trigger signal; generating an error signal according to the reference voltage and a feedback voltage related to the output voltage; generating a compensation signal according to the error signal; and comparing the ramp signal and the compensation signal to generate a second comparison result for generating the trigger signal.

In an embodiment, the step (e) further includes: when the current sensing signal is greater than the default value, the first comparison result indicating that the load current exceeds the current threshold value, and the first comparison result makes a slope of a waveform of the ramp signal to be zero.

In an embodiment, the step (e) further includes: generating the trigger signal according to the first comparison result and the second comparison result for delaying the reset of the ramp signal.

In an embodiment, the step (d) further includes: comparing the reference voltage and a feedback voltage related to the output voltage to generate a second comparison result; and generating the trigger signal according to the first comparison result and the second comparison result.

Compared to the prior art, the controller of the power conversion circuit and its operating method of the invention perform current limit on the load current (total output current) under the premise of not changing the number of working phases (full-time operation of all phases) and the output current of each phase is balanced, so that the total output current does not exceed the default level and the output current of each phase is in a balanced state, so it can achieve effects of total output current limit and output current balance of each phase simultaneously.

The advantage and spirit of the invention may be understood by the following detailed descriptions together with the appended drawings.

DETAILED DESCRIPTION OF THE INVENTION

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

A specific embodiment according to the invention is a controller of a power conversion circuit. In this embodiment, the power conversion circuit is a multi-phase COT power conversion circuit, but not limited to this.

Figure 1:
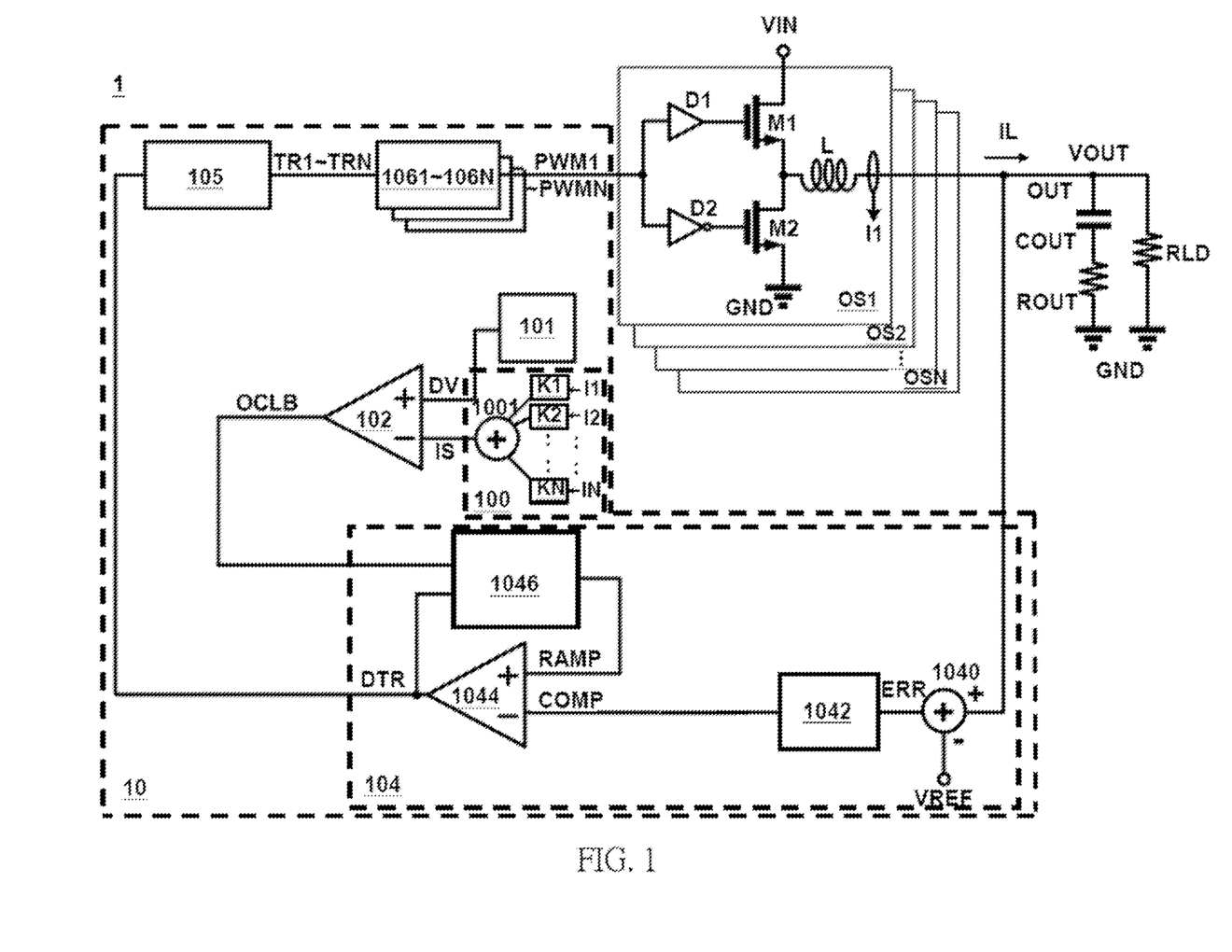
FIG. 1 illustrates a schematic diagram of a controller of a power conversion circuit according to an embodiment of the invention.

Please refer to FIG. 1. FIG. 1 illustrates a schematic diagram of a controller 10 of a power conversion circuit 1 in this embodiment. As shown in FIG. 1, in the power conversion circuit 1, the controller 10 is coupled to N output stage circuits OS1~OSN and generates N pulse width modulation signals PWM1~PWMN to control the N output stage circuits OS1~OSN respectively, so the power conversion circuit 1 provides an output voltage VOUT and a load current IL to an output terminal OUT. N is a positive integer greater than 1.

Each of the output stage circuits OS1~OSN includes drivers D1~D2, switches M1~M2 and an output inductor L. The driver D1 is coupled between the controller 10 and a control terminal of the switch M1. The driver D2 is coupled between the controller 10 and the control terminal of the switch M2. The switch M1 and the switch M2 are coupled in series between an input voltage VIN and a ground terminal GND. One terminal of the output inductor L is coupled between the switch M1 and the switch M2 and the other terminal of the output inductor L is coupled to the output terminal OUT. An output capacitor COUT and an output resistor ROUT are coupled in series between the output terminal OUT and the ground terminal GND. A load RLD is coupled between the output terminal OUT and the ground terminal GND.

The controller 10 includes a sensing circuit 100, a default value generation circuit 101, a first comparison circuit 102, a control loop 104, a sequence control circuit 105 and N PWM generation circuits 1061~106N. The sensing circuit 100 includes N phase current sensing circuits K1~KN and a summing circuit 1001. The N phase current sensing circuits K1~KN are coupled to the N output stage circuits OS1~OSN respectively to sense N phase currents I1~IN of the N output stage circuits OS1~OSN respectively to obtain N sensing signals, and then the summing circuit 1001 sums up the N sensing signals to generate a current sensing signal IS related to the load current IL. The default value generation circuit 101 is used for generating a default value DV as a current threshold value for limiting the load current IL. A positive input terminal + of the first comparison circuit 102 is coupled to the default value generation circuit 101 to receive the default value DV. The negative input terminal − of the first comparison circuit 102 is coupled to the sensing circuit 100 to receive the current sensing signal IS. The first comparison circuit 102 compares the current sensing signal IS with the default value DV to generate a first comparison result OCLB.

The control loop 104 is coupled to the output terminal of the first comparison circuit 102, the output terminal OUT and the sequence control circuit 105 respectively and is used to receive the output voltage VOUT, the reference voltage VREF and the first comparison result OCLB respectively to generate a trigger signal DTR to the sequence control circuit 105.

The sequence control circuit 105 is coupled between the control loop 104 and the N pulse width modulation generation circuits 1061~106N, and is used to sequentially generate N control signals TR1~TRN according to trigger signal DTR, which are then apply to the corresponding N pulse width modulation generation circuits 1061~106N. These N pulse width modulation generation circuits 1061~106N generate N pulse width modulation signals PWM1~PWMN, which are applied to the respective N output stage circuits OS1~OSN to control the operation of the N output stage circuits OS1~OSN, respectively.

In this embodiment, the control loop 104 includes an error amplifier 1040, a compensation circuit 1042, a second comparison circuit 1044 and a ramp signal generation circuit 1046. The error amplifier 1040 is coupled between the output terminal OUT and the compensation circuit 1042, and is used to receive the reference voltage VREF and the output voltage VOUT (or a feedback voltage related to the output voltage VOUT) to generate the error signal ERR. The compensation circuit 1042 is coupled between the error amplifier 1040 and the negative input terminal − of the second comparison circuit 1044, and is used to convert the error signal ERR into a compensation signal COMP and input it to the negative input terminal − of the second comparison circuit 1044.

The ramp signal generation circuit 1046 is coupled to the output terminal of the first comparison circuit 102 and the positive input terminal + and the output terminal of the second comparison circuit 1044, and is used to receive a first comparison result OCLB from the first comparison circuit 102 to generate the ramp signal RAMP to the positive input terminal + of the second comparison circuit 1044 and receive the trigger signal DTR from the output terminal of the second comparison circuit 1044 to reset the ramp signal RAMP. The positive input terminal + of the second comparison circuit 1044 is coupled to the ramp signal generation circuit 1046 and the negative input terminal − of the second comparison circuit 1044 is coupled to the compensation circuit 1042. The output terminal of the second comparison circuit 1044 is coupled to the ramp signal generation circuit 1046 and the sequence control circuit 105 respectively. The second comparison circuit 1044 compares the ramp signal RAMP and the compensation signal COMP to generate a second comparison result and output the second comparison result as the trigger signal DTR to the sequence control circuit 105.

It should be noted that when the current sensing signal IS is less than the default value DV, the first comparison result OCLB generated by the first comparison circuit 102 indicates that the load current does not exceed the current threshold value, and the control loop 104 normally provides the trigger signal DTR to the sequence control circuit 105, so that the PWM generation circuit 106 normally and sequentially generates the N PWM signals PWM1~PWMN to the N output stage circuits OS1~OSN. When the current sensing signal IS is greater than the default value DV, the first comparison result OCLB generated by the first comparison circuit 102 indicates that the load current exceeds the current threshold value, and the first comparison result OCLB makes the control loop 104 stop providing the trigger signal DTR to the sequence control circuit 105 temporarily to delay the time when the PWM generation circuit 106 generates the next PWM signal.

Specifically, in this embodiment, when the current sensing signal IS is greater than the default value DV, the counter in the ramp signal generation circuit 1046 will stop counting, and the current source will stop charging the capacitor to stop the accumulation of the ramp signal RAMP, this makes the slope of the ramp signal RAMP zero and the waveform stops rising, so as to delay the time when the ramp signal RAMP rises to intersect with the compensation signal COMP.

Figure 2:
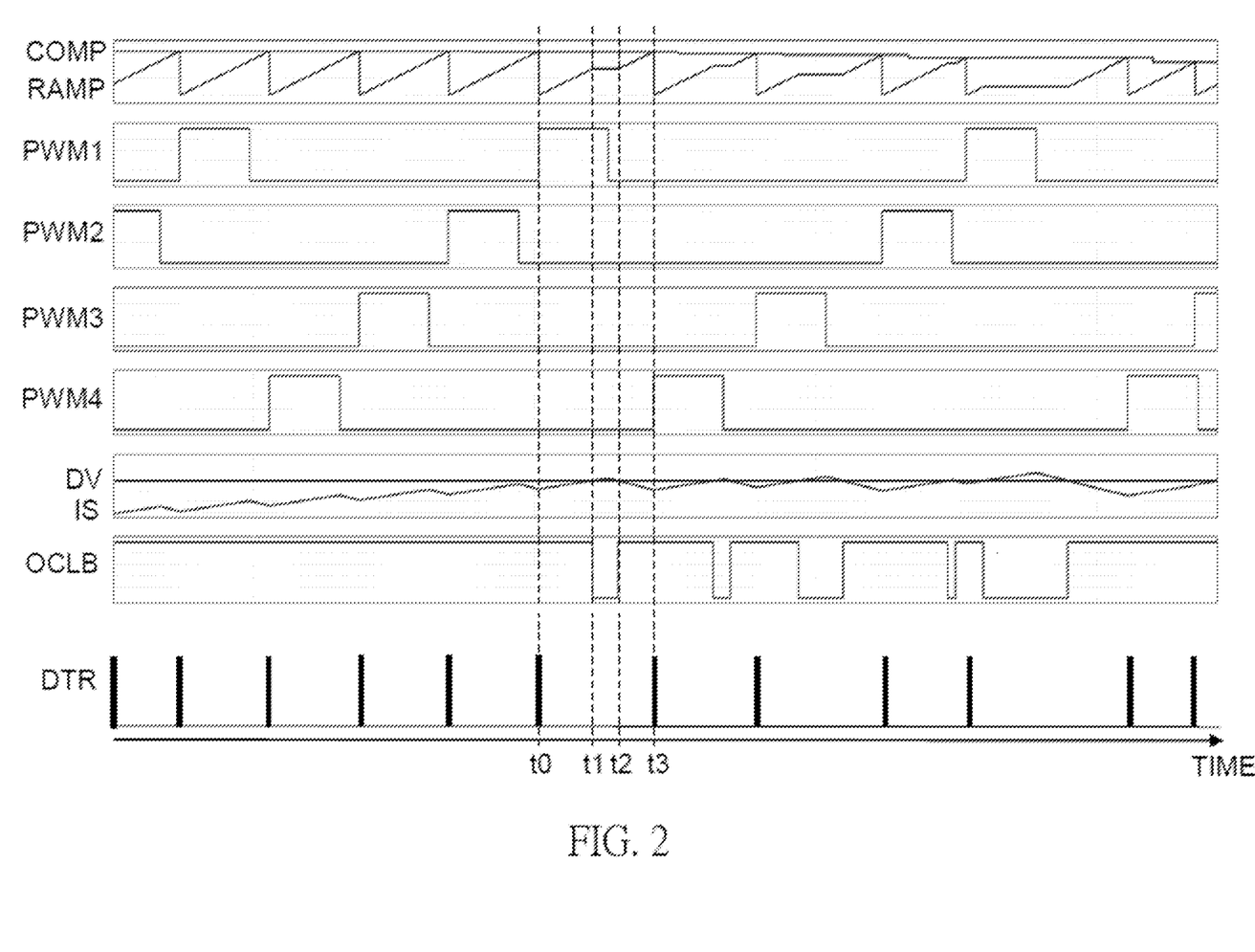
FIG. 2 illustrates timing diagrams of the waveforms of the signals shown in FIG. 1.

Please refer to FIG. 2. FIG. 2 illustrates a waveform timing diagram of the signals shown in FIG. 1. Taking N=4 as an example, the PWM generation circuit 106 sequentially generates PWM signals PWM4, PWM3, PWM2 and PWM1 to the output stage circuits OS4, OS3, OS2 and OS1 respectively according to the control signals TR1~TR4.

Before the time t1, the current sensing signal IS is less than the default value DV, and the PWM generation circuit 106 generates the PWM signals of each phase according to the intersection of the ramp signal RAMP and the compensation signal COMP respectively. For example, at the time t0, the ramp signal RAMP intersects with the compensation signal COMP to make the control loop 104 to generate the trigger signal DTR. The sequence control circuit 105 generates the control signal TR1 according to the trigger signal DTR to control the pulse width modulation generation circuit 106 to generate the pulse width modulation signal PWM1 and the ramp signal generation circuit 1046 simultaneously resets the waveform of the ramp signal RAMP according to the trigger signal DTR.

At the time t1, the current sensing signal IS starts to be greater than the default value DV, and the first comparison result OCLB outputted by the first comparison circuit 102 changes from original high-level to low-level, so that the slope of the ramp signal RAMP generated by the ramp signal generation circuit 1046 is zero, and the waveform remains at the current level.

Between the time t1 and the time t2, the waveform of the ramp signal RAMP stops changing, so the ramp signal RAMP and the compensation signal COMP do not cross (that is to say, no trigger signal DTR is generated), so that the pulse width modulation generation circuit 106 will not generate the next pulse width modulation signal (PWM4) during this period. During this period, the generated pulse width modulation signal PWM1 will continue until the end of the on-time period according to the original generation mechanism, and the next cycle will wait for the trigger signal DTR to be generated.

At the time t2, the current sensing signal IS is less than the default value DV, and the first comparison result OCLB outputted by the first comparison circuit 102 changes from low-level to high-level, so that the ramp signal RAMP generated by the circuit 1046 starts to rise again.

At the time t3, the ramp signal RAMP intersects with the compensation signal COMP, so that the control loop 104 generates the trigger signal DTR. The sequence control circuit 105 generates the control signal TR1 according to the trigger signal DTR, which control the PWM generation circuit 106 to generate the pulse width modulation signal PWM4 of next phase. The ramp signal generation circuit 1046 simultaneously resets the waveform of the ramp signal RAMP according to the trigger signal DTR.

Figure 3A:
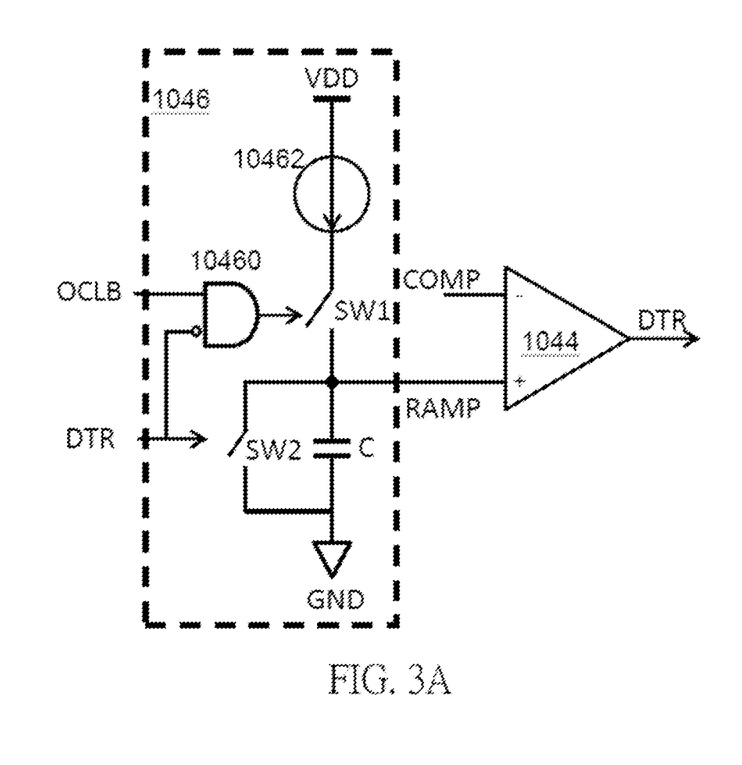
FIG. 3A illustrates an embodiment of the ramp signal generation circuit shown in FIG. 1.

Please refer to FIG. 3A. FIG. 3A illustrates an embodiment of the ramp signal generation circuit in FIG. 1. As shown in FIG. 3A, the rising ramp signal generation circuit 1046 includes a logic gate 10460, a current source 10462, switches SW1~SW2 and a capacitor C. The current source 10462, the switch SW1 and the capacitor C are coupled in series between a working voltage VDD and a ground terminal GND. The logic gate 10460 receives the first comparison result OCLB outputted by the first comparison circuit 102 and the trigger signal DTR outputted by the control circuit 104 respectively, and controls the conduction of switch SW1 according to the first comparison result OCLB and the trigger signal DTR. The switch SW2 is coupled to both terminals of the capacitor C and the conduction of the switch SW2 is controlled by the trigger signal DTR. The positive input terminal + of the second comparison circuit 1044 is coupled between the switch SW1 and the capacitor C to receive the ramp signal RAMP. The second comparison circuit 1044 compares the ramp signal RAMP with the compensation signal COMP, and outputs a second comparison result as the trigger signal DTR.

Figure 3B:
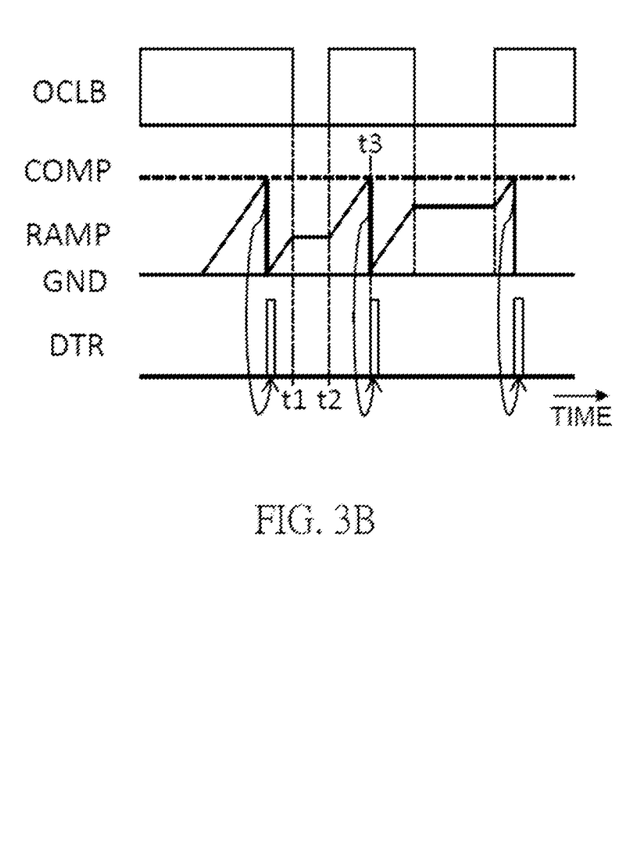
FIG. 3B illustrates timing diagrams of the waveforms of the signals shown in FIG. 3A.

Please refer to FIG. 3B. FIG. 3B illustrates a waveform timing diagram of each signal in FIG. 3A. As shown in FIG. 3B, at the time t1, the current sensing signal IS exceeds the default value DV, and the first comparison result OCLB changes from the original high-level to low-level, so that the logic gate 10460 controls the switch SW1 not turned on to disconnect the charging path of the capacitor C from the current source 10462. This stops the rising waveform of the ramp signal RAMP and maintains it at the current level. Between the time t1 and the time t2, the waveform of the ramp signal RAMP stops changing. At the time t2, the current sensing signal IS is less than the default value DV, and the first comparison result OCLB changes from low-level to high-level, so that the waveform of the ramp signal RAMP starts to rise again. At the time t3, when the ramp signal RAMP intersects with the compensation signal COMP, the second comparison circuit 1044 generates the trigger signal DTR and the switch SW2 is simultaneously controlled by the trigger signal DTR to be turned on to reset the waveform of the ramp signal RAMP.

Figure 4A:
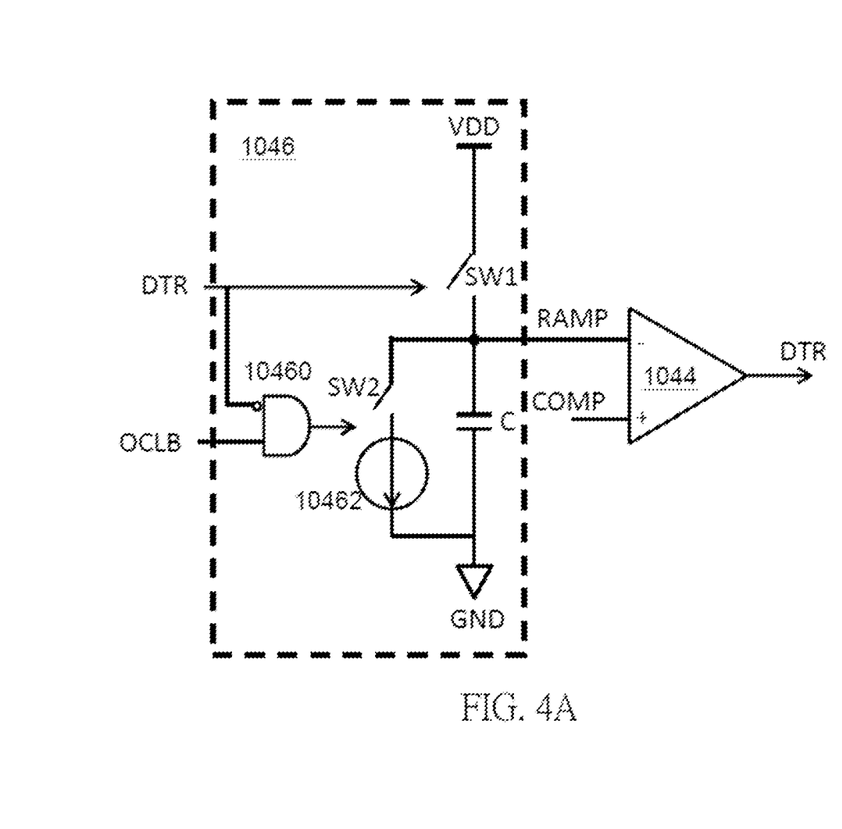
FIG. 4A illustrates another embodiment of the ramp signal generation circuit shown in FIG. 1.

Please refer to FIG. 4A. FIG. 4A illustrates another embodiment of the ramp signal generation circuit in FIG. 1. As shown in FIG. 4A, the falling ramp signal generation circuit 1046 includes a logic gate 10460, a current source 10462, switches SW1~SW2 and a capacitor C. The switch SW1 and the capacitor C are coupled in series between the working voltage VDD and the ground terminal GND. The conduction of switch SW1 is controlled by the trigger signal DTR. The switch SW2 and the current source 10462 are coupled in series to both terminals of the capacitor C. The logic gate 10460 receives the first comparison result OCLB outputted from the first comparison circuit 102 and the trigger signal DTR outputted by the control circuit 104 respectively and controls whether the switch SW2 is turned on or not according to the first comparison result OCLB and the trigger signal DTR. The negative input terminal − of the second comparison circuit 1044 is coupled between the switch SW1 and the capacitor C to receive the ramp signal RAMP. The second comparison circuit 1044 compares the ramp signal RAMP and the compensation signal COMP and outputs a second comparison result as the trigger signal DTR.

Figure 4B:
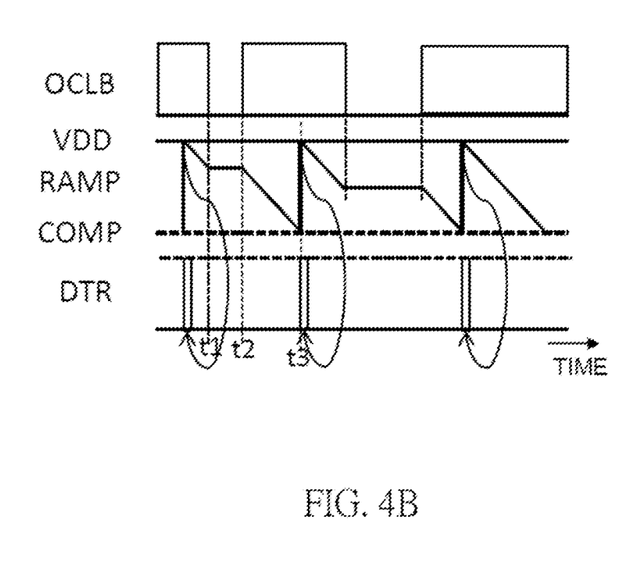
FIG. 4B illustrates timing diagrams of the waveforms of the signals shown in FIG. 4A.

Please refer to FIG. 4B. FIG. 4B illustrates timing diagrams of the waveforms of the signals shown in FIG. 4A. As shown in FIG. 4B, at the time t1, the current sensing signal IS exceeds the default value DV, and the first comparison result OCLB changes from the original high-level to low-level, so that the logic gate 10460 controls the switch SW2 not turned on to disconnect the discharge path, so that the waveform of the ramp signal RAMP stops falling and maintains at the current level. Between the time t1 and the time t2, the waveform of the ramp signal RAMP stops changing. At the time t2, the current sensing signal IS is less than the default value DV, and the first comparison result OCLB changes from low-level to high-level, so that the waveform of the ramp signal RAMP starts to fall again. At the time t3, when the ramp signal RAMP intersects with the compensation signal COMP, the second comparison circuit 1044 generates the trigger signal DTR, and the switch SW1 is simultaneously controlled by the trigger signal DTR to be turned on to reset the waveform of the ramp signal RAMP.

Figure 5:
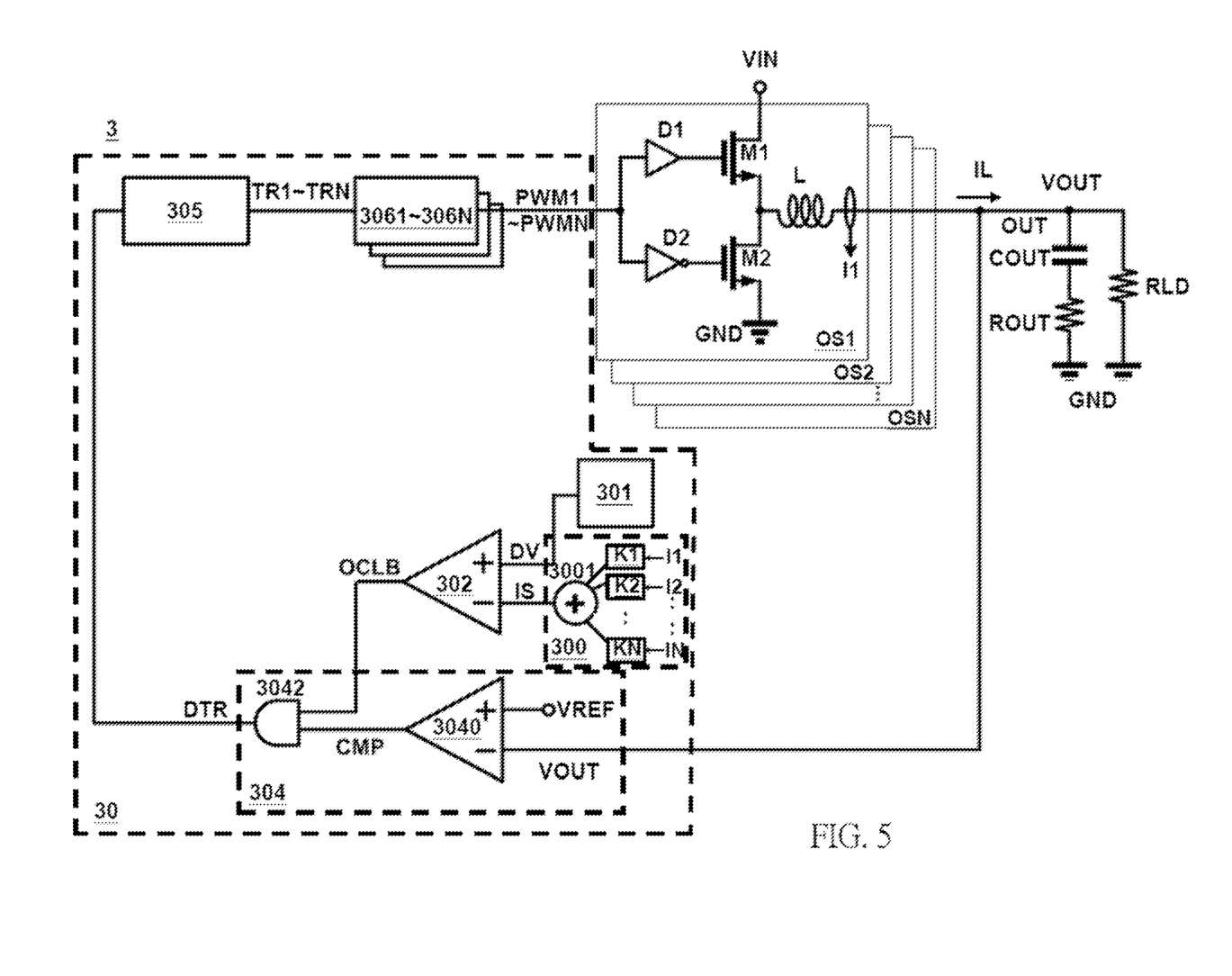
FIG. 5 illustrates a schematic diagram of a controller of a power conversion circuit according to another embodiment of the invention.

Please refer to FIG. 5. FIG. 5 illustrates a schematic diagram of a controller of a power conversion circuit according to another embodiment of the invention. As shown in FIG. 5, the controller 30 of the power conversion circuit 3 includes a sensing circuit 300, a default value generation circuit 301, a first comparison circuit 302, a control loop 304, a sequence control circuit 305 and N pulse width modulation generation circuits 3061~306N.

It should be noted that since the operating conditions of the sensing circuit 300, the default value generation circuit 301, the first comparison circuit 302, the sequence control circuit 305 and the N pulse width modulation generation circuits 3061~306N in FIG. 5 are the same with the operation conditions of the sensing circuit 100, the default value generation circuit 101, the first comparing circuit 102, the sequence control circuit 105 and the N pulse width modulation generation circuits 1061~106N in FIG. 1, the details will not be repeated here.

Next, the control loop 304 shown in FIG. 5 will be described in detail.

The control loop 304 includes a second comparison circuit 3040 and a logic gate 3042. The positive input terminal + of the second comparison circuit 3040 receives the reference voltage VREF and the negative input terminal − of the second comparison circuit 3040 is coupled to the output terminal OUT and receives the output voltage VOUT (or a feedback voltage related to the output voltage VOUT). The second comparison circuit 3040 compares the output voltage VOUT with the reference voltage VREF to generate a second comparison result CMP. The logic gate 3042 is coupled to the output terminals of the first comparison circuit 302 and the second comparison circuit 3040 respectively, to receive the first comparison result OCLB and the second comparison result CMP respectively and generate a trigger signal DTR to the sequence control circuit 305 according to the first comparison result OCLB and the second comparison result CMP.

When the current sensing signal IS is greater than the default value DV, the first comparison result OCLB changes from high-level to low-level, so that the logic gate 3042 stops generating the trigger signal DTR to the sequence control circuit 305, which control the PWM generation circuit 306 to stop generating the next PWM signal. Therefore, the next PWM signal will not be generated when the second comparison result CMP is at high-level.

Figure 6:
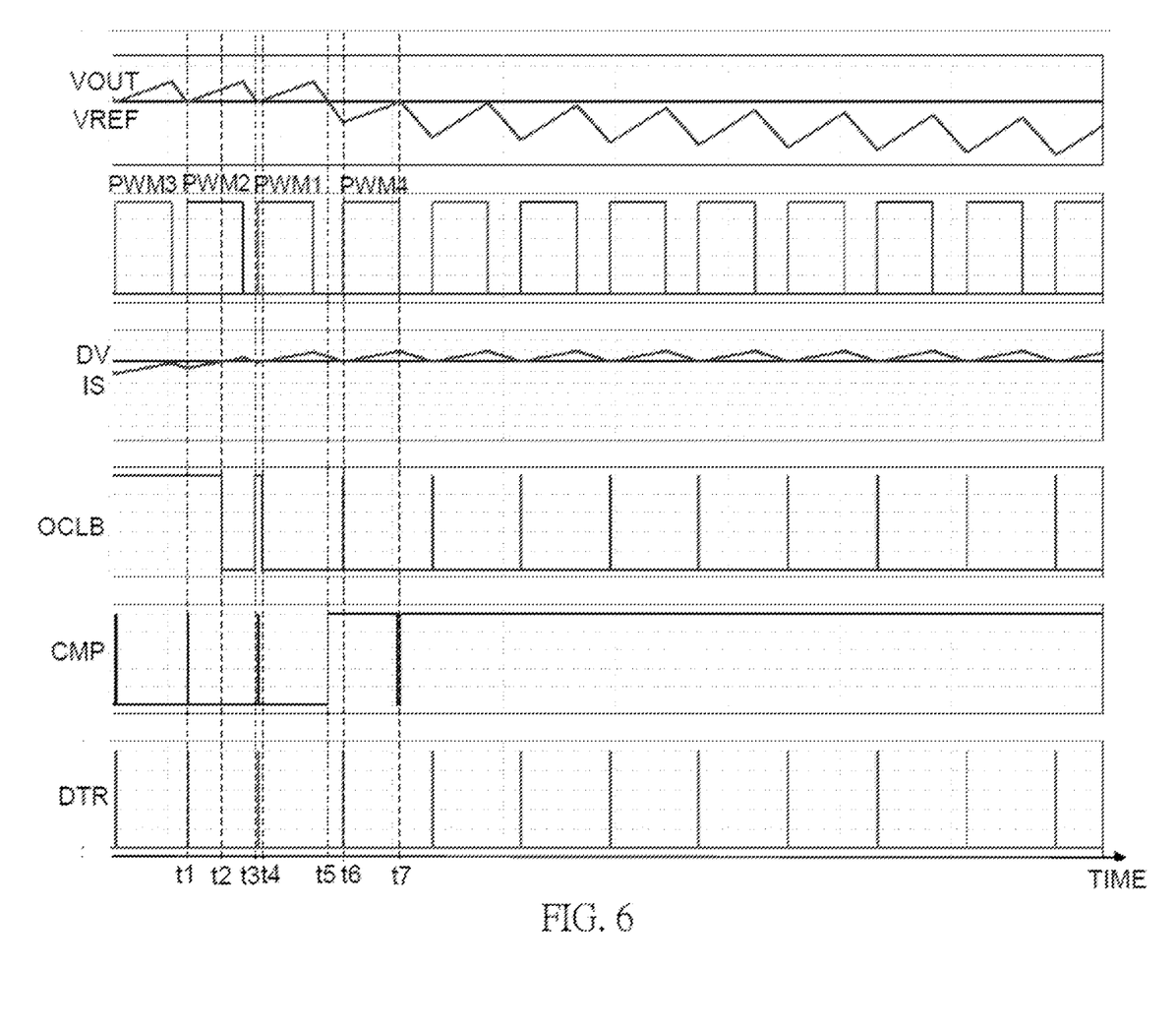
FIG. 6 illustrates timing diagrams of the waveforms of the signals shown in FIG. 5.

Please refer to FIG. 6. FIG. 6 illustrates a timing diagram of the waveforms of the signals in FIG. 5. Taking N=4 as an example, the PWM generation circuit 306 sequentially generates PWM signals PWM4, PWM3, PWM2 and PWM1 to the output stage circuits OS4, OS3, OS2 and OS1 respectively according to the control signals TR1~TR4.

At the time t1, the current sensing signal IS is less than the default value DV, the first comparison result OCLB generated by the first comparison circuit 302 is high, and the output voltage VOUT at this time is less than the reference voltage VREF. The second comparison result CMP generated by the second comparison circuit 3040 is high-level, so that the logic gate 3042 is allowed to generate the trigger signal DTR to the sequence control circuit 305 to control the pulse width modulation generation circuit 306 to generate the pulse width modulation signal PWM2.

Between the time t2 and the time t3, the current sensing signal IS is greater than the default value DV, the first comparison result OCLB generated by the first comparison circuit 302 is low-level, and the output voltage VOUT at this time is greater than the reference voltage VREF, the second comparison result CMP generated by the second comparison circuit 3040 is low-level, and the logic gate 3042 will not generate the trigger signal DTR to the sequence control circuit 305 at this time.

During the period from the time t3 to the time t5, since it is the same as the time t1 to the time t3, the details will not be repeated here.

At the time t5, the current sensing signal IS is greater than the default value DV, the first comparison result OCLB generated by the first comparison circuit 302 is low-level, and the output voltage VOUT at this time is less than the reference voltage VREF, the second comparison result CMP generated by the second comparison circuit 3040 is high-level. Since the first comparison result OCLB of low-level covers the second comparison result CMP of high-level, the logic gate 3042 temporarily stops generating the trigger signal DTR to the sequence control circuit 305, to control the PWM generation circuit 306 to temporarily stop generating the next PWM signal.

At the time t6, the current sensing signal IS is less than the default value DV, the first comparison result OCLB generated by the first comparison circuit 302 is high-level, and the output voltage VOUT at this time is less than the reference voltage VREF, the second comparison result CMP generated by the second comparison circuit 3040 is high-level. This allows the logic gate 3042 generate the trigger signal DTR to the sequence control circuit 305 to control the pulse width modulation generation circuit 306 to generate the pulse width modulation signal PWM4.

After the time t7, since the output voltage VOUT is less than the reference voltage VREF, the second comparison result CMP generated by the second comparison circuit 3040 is high-level, so that when the comparison result OCLB generated by the first comparison circuit 302 is high-level, the logic gate 3042 generates the trigger signal DTR to the sequence control circuit 305 to control the PWM generation circuit 306 to generate the PWM signals sequentially.

Figure 7:
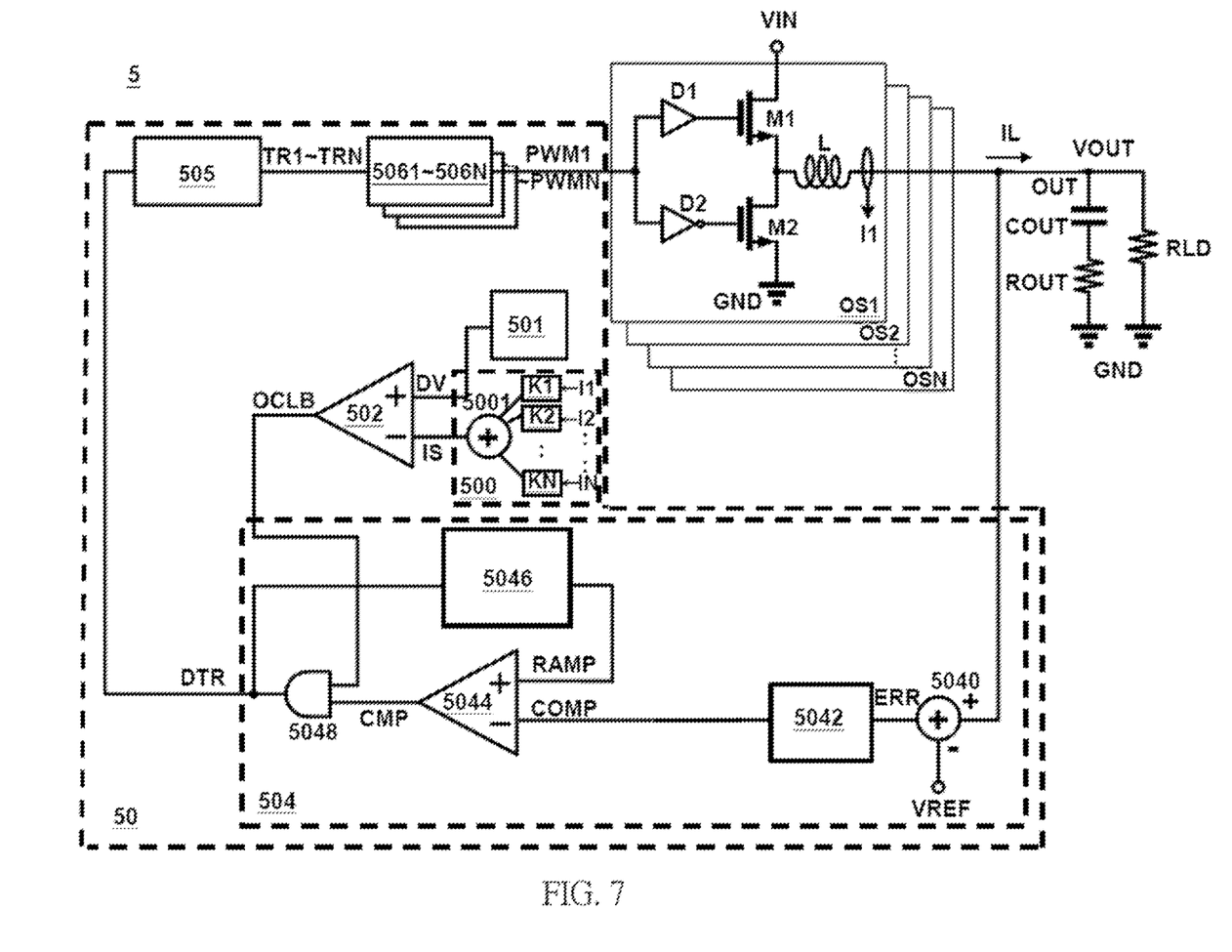
FIG. 7 illustrates a schematic diagram of a controller of a power conversion circuit according to still another embodiment of the invention.

Please refer to FIG. 7. FIG. 7 illustrates a schematic diagram of a controller of a power conversion circuit according to another embodiment of the invention. As shown in FIG. 7, the controller 50 of the power conversion circuit 5 includes a sensing circuit 500, a default value generation circuit 501, a first comparison circuit 502, a control loop 504, a sequence control circuit 505 and N pulse width modulation generation circuits 5061~506N.

It should be noted that, since the operating conditions of the sensing circuit 500, the default value generation circuit 501, the first comparison circuit 502, the sequence control circuit 505 and the pulse width modulation generation circuits 5061~506N in FIG. 7 are the same with the operating conditions of the sensing circuit 100, the default value generation circuit 101, the first comparing circuit 102, the sequence control circuit 105 and the PWM generation circuits 1061~106N in FIG. 1, the details will not be repeated here.

Next, the control loop 504 in FIG. 7 will be described in detail.

The control loop 504 includes an error amplifier 5040, a compensation circuit 5042, a second comparison circuit 5044, a ramp signal generation circuit 5046 and a logic gate 5048. The error amplifier 5040 is coupled between the output terminal OUT and the compensation circuit 5042, and is used for receiving the reference voltage VREF and the output voltage VOUT (or the feedback voltage related to the output voltage VOUT) to generate the error signal ERR. The compensation circuit 5042 is coupled between the error amplifier 5040 and the negative input terminal − of the second comparison circuit 5044, and is used for converting the error signal ERR into the compensation signal COMP and inputting the compensation signal COMP to the negative input terminal − of the second comparison circuit 5044.

The ramp signal generation circuit 5046 is coupled to the positive input terminal + of the second comparison circuit 5044 and the output terminal of the logic gate 5048 respectively to generate the ramp signal RAMP to the positive input terminal + of the second comparison circuit 5044 and to receive the trigger signal DTR from the output terminal of the logic gate 5048 to reset the ramp signal RAMP.

The positive input terminal + of the second comparison circuit 5044 is coupled to the ramp signal generation circuit 5046. The negative input terminal − of the second comparison circuit 1044 is coupled to the compensation circuit 5042. The output terminal of the second comparison circuit 5044 is coupled to the input terminal of the logic gate 5048. The second comparison circuit 5044 compares the ramp signal RAMP and the compensation signal COMP to generate the second comparison result CMP to the logic gate 5048. The logic gate 5048 is coupled to the output terminal of the first comparison circuit 502, the output terminal of the second comparison circuit 5044 and the sequence control circuit 505, respectively, to receive the first comparison result OCLB generated by the first comparison circuit 502 and the second comparison result CMP generated by the second comparison circuit 5044, and accordingly generate the trigger signal DTR outputting to the sequence control circuit 505.

It should be noted that when the first comparison result OCLB generated by the first comparison circuit 502 indicates that the current sensing signal IS is less than the default value DV, the control loop 504 normally provides the trigger signal DTR to the sequence control circuit 505, so that the PWM generation circuit 506 normally and sequentially generates the N PWM signals PWM1~PWMN to the N output-stage circuits OS1~OSN. When the first comparison result OCLB generated by the first comparison circuit 502 indicates that the current sensing signal IS exceeds the default value DV, the first comparison result OCLB makes the control loop 504 stop providing the trigger signal DTR to the sequence control circuit 505 temporarily, so as to delay the generation of the next PWM signal by PWM generation circuit 506.

Figure 8:
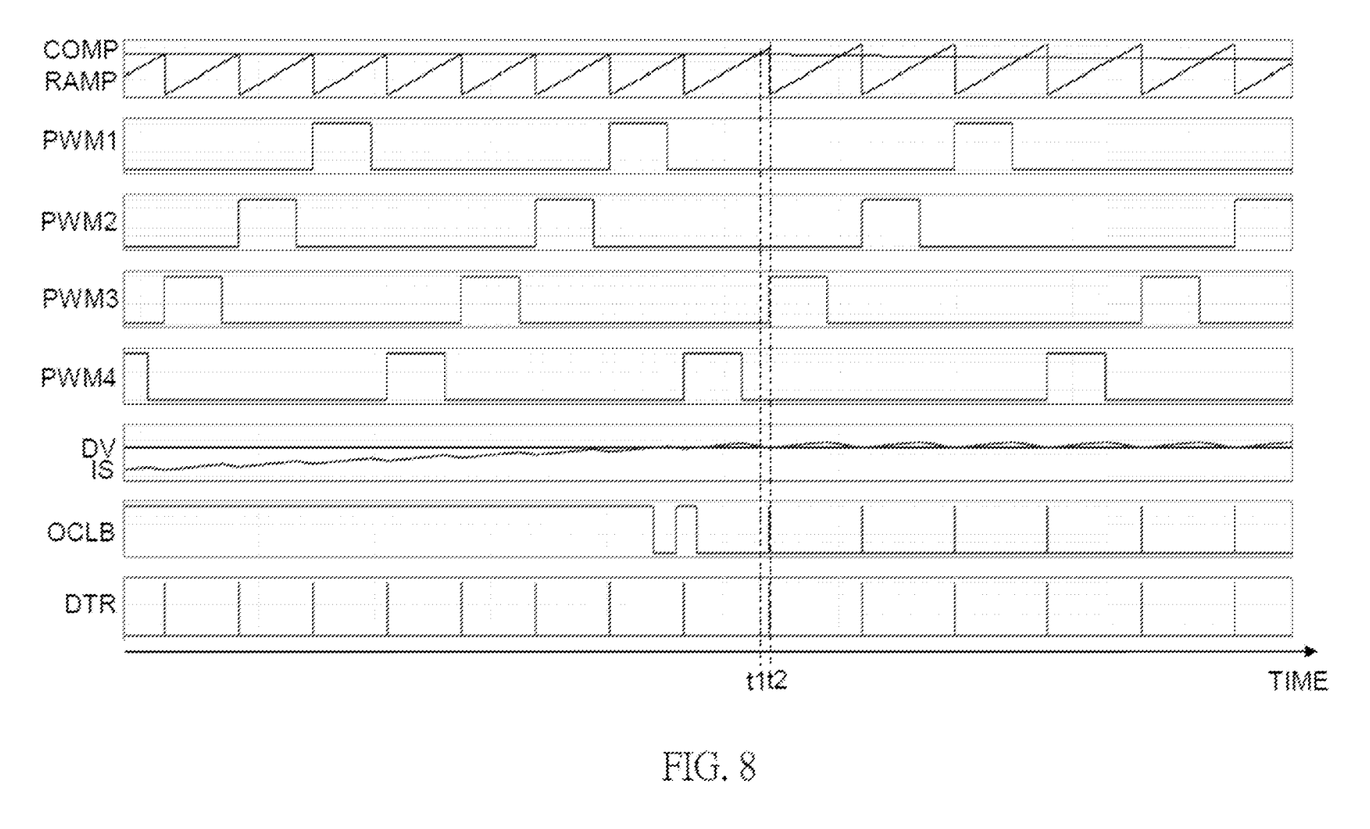
FIG. 8 illustrates timing diagrams of the waveforms of the signals shown in FIG. 7.

Please refer to FIG. 8. FIG. 8 illustrates timing diagrams of the waveforms of the signals in FIG. 7. The difference between FIG. 8 and FIG. 2 is that in FIG. 2, at the time t0, when the ramp signal RAMP intersects with the compensation signal COMP, the control loop 104 immediately sends the trigger signal DTR to activate the PWM generation circuit 106 to generate the next PWM signal. In FIG. 8, at the time t1, when the ramp signal RAMP intersects with the compensation signal COMP, the control loop 504 does not immediately output the trigger signal DTR. Instead, it waits until the time t2, when the current sensing signal IS is less than the default value DV, the control loop 504 is allowed to output the trigger signal DTR to start the PWM generation circuit 506 to generate the next PWM signal.

Figure 9:
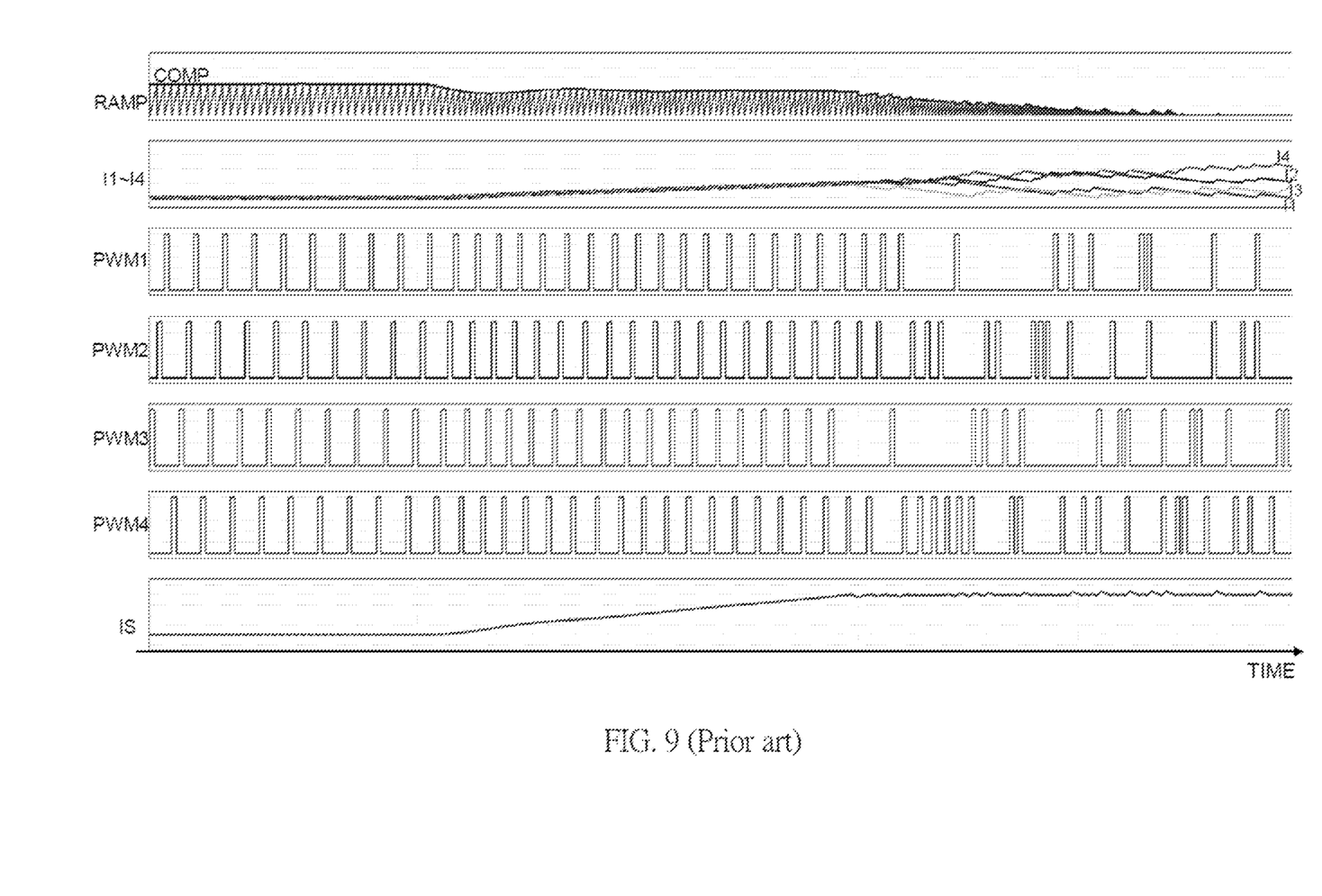
FIG. 9 illustrates timing diagrams of the waveforms of the unbalanced state between the output currents of each phase when the skip mode is used for total output current limit of the multi-phase system in prior art.
Figure 10:
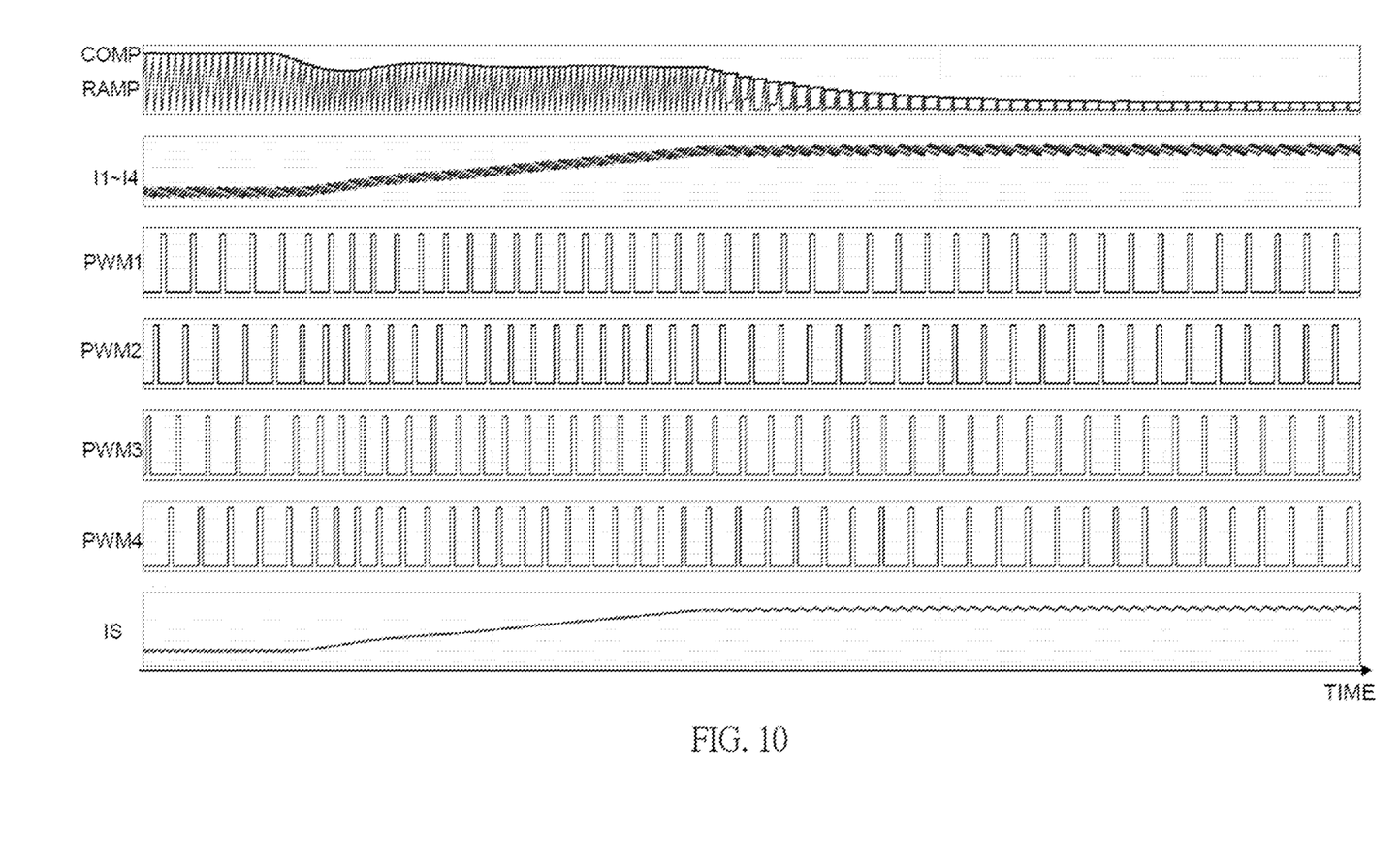
FIG. 10 illustrates timing diagrams of the waveforms of the balanced state between the output currents of each phase when the total output current limit is performed in the invention.

Please refer to FIG. 9 and FIG. 10 at the same time. In FIG. 9, since the prior art uses the skip mode to limit the total current, when the total current exceeds the default level, a shielding signal is sent to cover the next PWM signal, resulting in a relatively low PWM signal of a specific phase. It is often shielded and the output currents I1~I4 of each phase become quite unbalanced. In FIG. 10, since the invention does not change the number of working phases (full-time operation of all phases) and the output current I1~I4 of each phase is averaged, the total output current (that is to say, the current sensing signal IS) is limited, so that the total output current IS does not exceed a default level and the output currents I1~I4 of each phase are in a balanced state. Therefore, after comparing FIG. 9 with FIG. 10, it can be seen that the invention delays the overall PWM signal, so the effect of current limitation can be achieved without affecting the output of each phase current. It can effectively solve the problem that the output current of each phase is unbalanced when the total output current is limited in the prior art, and achieve the effect of both the limiting of the total output current and the balance of the output current of each phase.

Another specific embodiment according to the invention is an operating method of a controller of a power conversion circuit. In this embodiment, the power conversion circuit is a multi-phase constant on-time (COT) power conversion circuit. The controller is coupled to a plurality of output stage circuits and generates a plurality of PWM signals to respectively control the output stage circuits, so that the power conversion circuit provides an output voltage and a load current to the output terminal.

Figure 11:
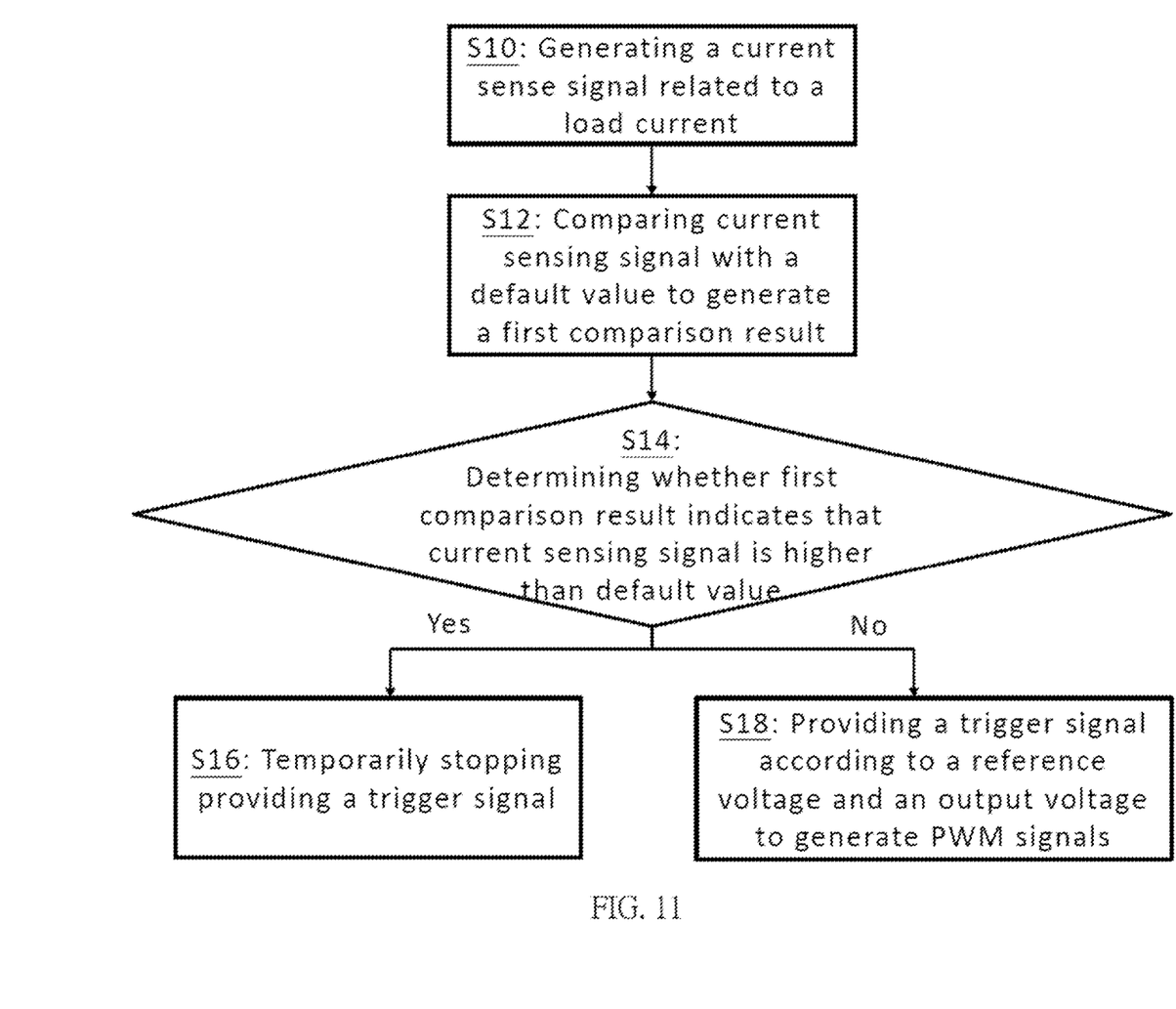
FIG. 11 illustrates a flowchart of an operating method of a controller of a power conversion circuit according to another embodiment of the invention.

Please refer to FIG. 11. FIG. 11 illustrates a flow chart of the operating method of the controller of the power conversion circuit in this embodiment. As shown in FIG. 11, the operating method of the controller of the power conversion circuit includes the following steps:

Step S10: generating a current sensing signal related to the load current;

Step S12: comparing the current sensing signal and a default value to generate a first comparison result;

Step S14: determining whether the first comparison result indicates that the load current exceeds the current threshold value;

Step S16: if the determination result of the step S14 is yes, stopping providing the trigger signal temporarily to delay the generation of the PWM signals; and Step S18: if a determination result of the step S14 is no, providing a trigger signal according to a reference voltage and the output voltage to generate the PWM signals.

In practical applications, the operation method can generate a ramp signal according to the first comparison result, and generate an error signal according to the reference voltage and the feedback voltage related to the output voltage. The ramp signal and the error signal are then compared to generate the second comparison result, but not limited to this.

In one embodiment, the operating method generates a trigger signal according to the first comparison result. For example, the second comparison result can be generated according to the first comparison result, and the second comparison result can be directly provided as a trigger signal. Or, the first comparison result and the second comparison result are logically determined to generate the trigger signal. Then, the operation method resets the ramp signal according to the delayed trigger signal due to the temporary stop, but not limited to this.

In another embodiment, since the power conversion circuit is a multi-phase COT power conversion circuit, the operating method further includes: sensing a plurality of output currents of a plurality of output stage circuits respectively to obtain a plurality of phase sensing signals; and summing the phase sensing signals to obtain a current sensing signal, but not limited to this.

Compared to the prior art, the controller of the power conversion circuit and its operating method of the invention perform current limit on the load current (total output current) under the premise of not changing the number of working phases (full-time operation of all phases) and the output current of each phase is balanced, so that the total output current does not exceed the default level and the output current of each phase is in a balanced state, so it can achieve effects of total output current limit and output current balance of each phase simultaneously.

With the example and explanations above, the characteristics and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A controller of a power conversion circuit, coupled to a plurality of output stage circuits and generating a plurality of pulse width modulation (PWM) signals to control the output stage circuits respectively, so that the power conversion circuit provides an output voltage and a load current to an output terminal, the controller comprising:

a sensing circuit, coupled to the output stage circuits and configured to generate a current sensing signal related to the load current;

a first comparison circuit, coupled to the sensing circuit and configured to compare the current sensing signal and a default value to generate a first comparison result, wherein the default value represents a current threshold value;

a PWM generation circuit, coupled to the output stage circuits; and a control loop, coupled between the output terminal and the PWM generation circuit and also coupled to the first comparison circuit, the control loop being configured to generate a trigger signal according to a reference voltage and the output voltage to control the PWM generation circuit to generate the PWM signals, wherein when the first comparison result indicates that the load current exceeds the current threshold value, the first comparison result makes the control loop to stop providing the trigger signal to the PWM generation circuit temporarily to delay the generation of the PWM signals, the control loop comprises:

a ramp signal generation circuit, configured to generate a ramp signal and receive the trigger signal to reset the ramp signal;

an error amplifier, coupled to the output terminal and configured to receive the reference voltage and a feedback voltage related to the output voltage to generate an error signal;

a compensation circuit, coupled to the error amplifier and configured to receive the error signal to generate a compensation signal; and a second comparison circuit, coupled to the ramp signal generation circuit, the compensation circuit and the PWM generation circuit respectively and configured to compare the ramp signal and the compensation signal to generate a second comparison result for generating the trigger signal.

2. The controller of claim 1, wherein the ramp signal generation circuit is also coupled to the first comparison circuit; when the current sensing signal is greater than the default value, the first comparison result indicates that the load current exceeds the current threshold value, and the first comparison result makes a slope of a waveform of the ramp signal to be zero.

3. The controller of claim 1, wherein the control loop further comprises:
 a logic gate, coupled to the first comparison circuit and the second comparison circuit respectively and configured to generate the trigger signal according to the first comparison result and the second comparison result for delaying the reset of the ramp signal.

4. A controller of a power conversion circuit, coupled to a plurality of output stage circuits and generating a plurality of pulse width modulation (PWM) signals to control the output stage circuits respectively, so that the power conversion circuit providing an output voltage and a load current to an output terminal, the controller comprising:
 a sensing circuit, coupled to the output stage circuits and configured to generate a current sensing signal related to the load current;
 a first comparison circuit, coupled to the sensing circuit and configured to compare the current sensing signal and a default value to generate a first comparison result, wherein the default value represents a current threshold value;
 a PWM generation circuit, coupled to the output stage circuits; and
 a control loop, coupled between the output terminal and the PWM generation circuit and also coupled to the first comparison circuit, the control loop being configured to generate a trigger signal according to a reference voltage and the output voltage to control the PWM generation circuit to generate the PWM signals,
wherein when the first comparison result indicates that the load current exceeds the current threshold value, the first comparison result makes the control loop to stop providing the trigger signal to the PWM generation circuit temporarily to delay the generation of the PWM signals, wherein the control loop comprises:
 a second comparison circuit, coupled to the output terminal and configured to receive and compare the reference voltage and a feedback voltage related to the output voltage to generate a second comparison result; and
 a logic gate, coupled to the first comparison circuit and the second comparison circuit respectively and configured to generate the trigger signal according to the first comparison result and the second comparison result.

\* \* \* \* \*